R. W. THOMSON.

Traction Wheel.

No. 98,126. Patented Dec. 21, 1869.

Witnesses:
J. H. Adams
M. L. Williamson

Inventor:
R. W. Thomson
by D. D. Williamson

United States Patent Office.

ROBERT WILLIAM THOMSON, OF EDINBURGH, GREAT BRITAIN.

Letters Patent No. 98,126 dated December 21, 1869; patented in England, April 21, 1868.

IMPROVEMENT IN WHEEL FOR STEAM-CARRIAGES.

The Schedule referred to in these Letters Patent and making part of the same

*To all whom it may concern:*

Be it known that I, ROBERT WILLIAM THOMSON, of Edinburgh, in the county of Mid-Lothian, Kingdom of Great Britain and Ireland, have invented a new and useful Improvement in Wheels for Road-Steamers, for drawing, carrying, or travelling; and I do hereby declare the following to be a full, clear, and exact description of the same, reference being had to the accompanying drawing, and to the reference letters marked thereon.

The object of my invention is to develop, to a fuller extent than has been hitherto attained, the now completely-established advantages of fitting road-steamers (also sometimes termed traction-engines) with wheels having tires of vulcanized or similarly-prepared rubber; and It consists in applying separated segmental metal shoes upon the outer surfaces of the rubber tire, and in perforating the cylindrical metal shell of the wheel on which the tire fits.

The shoes are made with flanges, loosely embracing the sides of the rubber tire, and they are connected by links jointed to these flanges.

The shoes are arranged slightly apart, the spaces between them thus forming transverse grooves upon the outer treading-surface of the wheel; and, while the shoes protect the rubber tire, they also act as shallow teeth, and insure a proper adhesion or bite upon the ground, being of especial advantage in this way, as compared with the bare rubber, when the ground-surface is in a semi-moist condition, known as "greasy" or "pasty."

The perforations in the metal shell, at the inside of the rubber tire, allow air to get in under the rubber, which gives the rubber freedom of action in creeping slowly around the wheel, as it is found to do in practice.

And, in order that others skilled in the art may be enabled to make and use my invention, I will proceed to describe my improved wheel.

The body or frame A of the wheel is represented as built up or constructed of wrought-iron plates, strengthened by angle-iron; but that part may, of course, be constructed otherwise, if preferred.

The frame A is formed with a broad, shallow, circumferential groove, upon the bottom cylindrical surface, B, of which, the inside of the rubber tire C bears.

The shoes D are plates of wrought-iron or suitable metal, and are formed with flanges, E, which are wide enough apart not to gripe the sides of the rubber tire.

The shoe-flanges E are connected by links F, which keep the shoes properly spaced, and retain them upon the rubber tire C.

Figure 1:
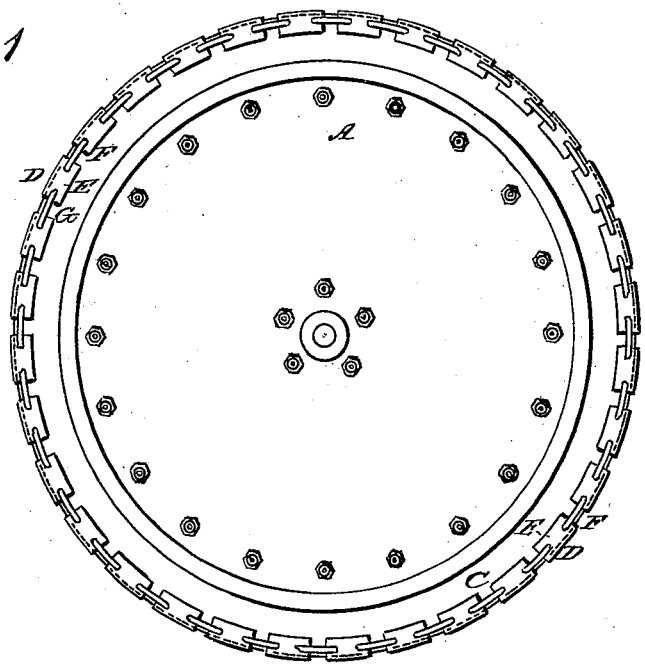
Figure 1 is a face view.
Figure 2:
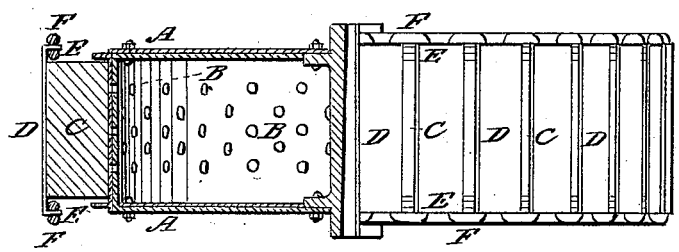
Figure 2 is an edge view, partly in section.

The cylindrical shell B of the wheel-frame is perforated, as shown in the sectional part of fig. 2, to admit air behind the rubber tire, as hereinbefore explained.

What I claim as my invention, and desire to secure by Letters Patent, is—

1. The applying of separated segmental metal shoes to rubber tires of road-steamer wheels.

2. The perforating of the shell on which the rubber tire bears, in the manner and for the purpose described.

In testimony whereof, I sign my name to this specification, in the presence of two subscribing witnesses.

R. W. THOMSON.

Witnesses:
 EDMUND HUNT,
 WILLIAM PAGE.